United States Patent
Panigrahi

(10) Patent No.: US 11,693,953 B2
(45) Date of Patent: Jul. 4, 2023

(54) SECURE VALIDATION PIPELINE IN A THIRD-PARTY CLOUD ENVIRONMENT

(71) Applicant: Barclays Execution Services Limited, London (GB)

(72) Inventor: Jeeban Panigrahi, London (GB)

(73) Assignee: Barclays Execution Services Limited, London (GB)

(*) Notice: Subject to any disclaimer, the term of this patent is extended or adjusted under 35 U.S.C. 154(b) by 407 days.

(21) Appl. No.: 17/006,165

(22) Filed: Aug. 28, 2020

(65) Prior Publication Data

US 2021/0064742 A1    Mar. 4, 2021

(30) Foreign Application Priority Data

Aug. 30, 2019 (EP) .................................... 19194741

(51) Int. Cl.
*G06F 21/53* (2013.01)
*G06F 21/51* (2013.01)
(Continued)

(52) U.S. Cl.
CPC ............ *G06F 21/53* (2013.01); *G06F 9/5072* (2013.01); *G06F 9/547* (2013.01);
(Continued)

(58) Field of Classification Search
CPC ........ G06F 21/53; G06F 9/5072; G06F 9/547; G06F 11/3476; G06F 21/51; G06F 2221/2141
(Continued)

(56) References Cited

U.S. PATENT DOCUMENTS

| 6,275,938 B1* | 8/2001 | Bond ..................... G06F 21/53 |
| | | 714/38.14 |
| 2004/0177261 A1* | 9/2004 | Watt ..................... G06F 12/1491 |
| | | 711/E12.1 |

(Continued)

OTHER PUBLICATIONS

European Search Report dated Mar. 4, 2020, in application No. EP 19194741.5. 7 pages.

(Continued)

*Primary Examiner* — Thanh T Le
(74) *Attorney, Agent, or Firm* — Wilmer Cutler Pickering Hale and Dorr LLP

(57) ABSTRACT

A pipeline for securely validating computer executable code in a third-party cloud environment is provided. The pipeline comprises an on-boarding account and a run account. The on-boarding account is configured to allow the user to access computer executable code input into the third-party cloud environment from the user and prevent the user from accessing the protected data input into the third-party cloud environment from a secure provider. The on-boarding account is also configured to transmit the computer executable code from the on-boarding account to another account in the third-party cloud environment if a first predetermined criterion is met. The run account is configured to allow the user to execute the computer executable code with the protected data and prevent the user from accessing the computer executable code. Moreover, a process for generating the pipeline and a method of securely validating computer executable code in a third-party cloud environment using the pipeline is provided.

21 Claims, 6 Drawing Sheets

(51) Int. Cl.
  *G06F 9/50* (2006.01)
  *G06F 9/54* (2006.01)
  *G06F 11/34* (2006.01)

(52) U.S. Cl.
  CPC .......... *G06F 11/3476* (2013.01); *G06F 21/51* (2013.01); *G06F 2221/2141* (2013.01)

(58) Field of Classification Search
  USPC .......................................................... 726/22
  See application file for complete search history.

(56) References Cited

U.S. PATENT DOCUMENTS

| | | | |
|---|---|---|---|
| 2006/0047958 A1* | 3/2006 | Morais | G06F 21/51 713/166 |
| 2007/0250927 A1* | 10/2007 | Naik | G06F 21/566 726/22 |
| 2011/0162075 A1* | 6/2011 | Lin | H04N 21/835 713/168 |
| 2012/0185913 A1 | 7/2012 | Martinez et al. | |
| 2012/0297454 A1* | 11/2012 | Auger | H04L 63/107 726/4 |
| 2014/0026122 A1 | 1/2014 | Markande et al. | |
| 2014/0380058 A1* | 12/2014 | Agarwal | G06F 21/51 713/176 |
| 2015/0007142 A1* | 1/2015 | Biffle | G06F 21/53 717/126 |
| 2015/0271200 A1* | 9/2015 | Brady | H04L 63/1416 726/4 |
| 2016/0006792 A1* | 1/2016 | Goldenberg | G06F 21/6218 709/217 |
| 2016/0337356 A1 | 11/2016 | Simon et al. | |
| 2017/0207968 A1 | 7/2017 | Eicken et al. | |
| 2018/0027007 A1* | 1/2018 | Shah | H04L 67/02 726/22 |
| 2018/0351941 A1* | 12/2018 | Chhabra | H04L 9/38 |
| 2019/0095617 A1* | 3/2019 | Stefan | G06F 8/75 |
| 2019/0243979 A1* | 8/2019 | De Gaetano | G06N 20/00 |
| 2019/0286549 A1* | 9/2019 | Mola | G06F 21/6218 |
| 2020/0026639 A1* | 1/2020 | Mola | G06F 11/3636 |
| 2020/0097646 A1* | 3/2020 | Buhren | G06F 21/53 |
| 2020/0233789 A1* | 7/2020 | Battaglia | G06F 11/3688 |
| 2020/0293695 A1* | 9/2020 | Hamamoto | G06F 12/1425 |
| 2020/0349556 A1* | 11/2020 | Yao | G06Q 40/02 |

OTHER PUBLICATIONS

Written Opinion of the International Preliminary Examining Authority, dated Jul. 28, 2021, in the International Application No. PCT/EP2020/074086. 5 pages.

* cited by examiner

SECURE VALIDATION PIPELINE IN A THIRD-PARTY CLOUD ENVIRONMENT

CROSS-REFERENCE TO RELATED APPLICATIONS

This application claims priority to EP Patent Application No. 19194741.5, filed Aug. 30, 2019, the disclosure of which is hereby incorporated by reference herein in its entirety.

TECHNICAL FIELD

The present invention relates to a pipeline for securely validating computer executable code in a third-party cloud environment. In particular, the present invention relates to the pipeline, a process for generating the pipeline, and a method of securely validating computer executable code in a third-party cloud environment using the pipeline.

BACKGROUND

In cloud computing environments, computer resources, especially data processing and data storage, are delivered in an on-demand fashion to users via a communication network such as the Internet. Typically, cloud environments are provided by a third party who own and maintain the physical hardware underlying the cloud environment. This takes away the burden from the users for provisioning and maintaining their own physical computer hardware. Moreover, as computer resources are delivered via a communication network, the accessibility of the computer resources to the users is high. Further, by providing computer resources for a multitude of users, third-party cloud environments benefit from economies of scale. In combination, these factors make third-party cloud environments particularly adept for processing and storing large quantities of data, and convenient when more than two parties are involved. This has contributed to an acceleration in use of third-party cloud environments over the past decade. Examples of third-party cloud environments include Amazon Web Services (AWS), Microsoft Azure, Google Cloud Platform, and IMB Cloud.

Third-party cloud environments suffer from poor security provisions. Although third-party cloud environments do offer basic security provisions, particularly in view of the multitude of users using the cloud environment, such cloud environments are not currently suitable in certain use cases, particularly use cases in which protected data is involved. An example of a use case in which third-party cloud environments are not currently suitable is the execution of computer executable code which, when executed, interacts with protected data. As a consequence, new computer executable code that interacts with protected data cannot currently be validated in third-party cloud environments in a secure manner.

SUMMARY

In one aspect of the invention, there is provided a process for generating a pipeline for securely validating computer executable code in a third-party cloud environment. The process comprises receiving, from a user or from a secure provider into the third-party cloud environment, a request to validate computer executable code which has been input into the third-party cloud environment from the user, the computer executable code being configured to process protected data input into the third-party cloud environment from the secure provider; generating within the third-party cloud environment, a first account for the user, wherein the first account is configured with a first predetermined user access level to the protected data and the computer executable code; and generating within the third-party cloud environment, a second account for the user, wherein the second account is configured with a second predetermined user access level to the protected data and the computer executable code, the second predetermined user access level having reduced access to the computer executable code and/or increased access to the protected data compared to the first predetermined user access level, wherein the first account is configured to transmit the computer executable code from the first account to the second account if a first predetermined criterion is met.

In some embodiments, the pipeline may comprise two accounts. In one such embodiment, the first account is a sandbox account and the second account is an on-boarding account, and the first predetermined criterion is a sandbox validation criterion. In another such embodiment, the first account is a preparation account and the second account is a run account, and the first predetermined criterion is a preparation validation criterion.

In some embodiments, the pipeline may comprise three accounts. In such embodiments, the process further comprises generating within the third-party cloud environment, a third account for the user, wherein the third account is configured with a third predetermined user access level to the protected data and the computer executable code, the third predetermined user access level having reduced access to the computer executable code and/or increased access to the protected data compared to the second predetermined user access level, wherein the second account is configured to transmit the computer executable code from the second account to the third account if a second predetermined criterion is met. In one such embodiment, the first account is an on-boarding account, the second account is a preparation account and the third account is a run account, and the first predetermined criterion is an on-boarding validation criterion and the second predetermined criterion is a preparation validation criterion.

In some embodiments, the pipeline may comprise four accounts. In such embodiments, the process further comprises generating within the third-party cloud environment, a fourth account for the user, wherein the fourth account is configured with a fourth predetermined user access level to the protected data and the computer executable code, the fourth predetermined user access level having reduced access to the computer executable code and/or increased access to the protected data compared to the third predetermined user access level, wherein the third account is configured to transmit the computer executable code from the third account to the fourth account if a third predetermined criterion is met. In one such embodiment, the first account is a sandbox account, the second account is an on-boarding account, the third account is a preparation account, and the fourth account is a run account, and the first predetermined criterion is a sandbox validation criterion, the second predetermined criterion is an on-boarding validation criterion, and the third predetermined criterion is a preparation validation criterion.

The preparation account may be configured to prevent user access to the protected data and prevent user access to the computer executable code. The preparation validation criterion may comprise that the computer executable code satisfies static code requirements, that only expected computer resources are used when executing the computer executable code, and/or that no malware is detected in the computer executable code.

The preparation account may be configured to log data traffic within the preparation account when executing the computer executable code. Moreover, the preparation account may be configured to analyse the data traffic to identify one or more data requests. The data requests may be a request to an external provider or a request to the secure provider. The preparation account may be configured to simulate one or more APIs.

The run account may be configured to allow the user to execute the computer executable code with the protected data and prevent the user from accessing the computer executable code.

The run account may be configured to log data traffic within the run account when executing the computer executable code. Moreover, the run account may be configured to analyse the data traffic to identify one or more data requests. The data requests may be a request to an external provider or a request to the secure provider. The run account may be configured to provide visualisation of the data traffic between the run account and the user, the secure provider and/or the external provider. The visualisation may depict the one or more data requests.

The run account may also be configured to identify whether any one of the one or more data requests is invalid. Further, the run account may be configured to intercept the invalid data requests.

The run account may be configured to restrict the user from retrieving output data, the output data resulting from executing the computer executable code with the protected data. In particular, the run account may be configured to prevent the user from obtaining a protected subset of the output data from the run account of the third-party cloud environment, but enabling the user to retrieve an unprotected subset of the output data. The unprotected subset of the output data may comprises only a summary of the output data, or may comprise a visual report provided to the user via the third-party cloud environment.

The on-boarding account may be configured to allow the user to access the computer executable code and prevent the user from accessing the protected data. Moreover, the on-boarding account may be configured to allow the user to modify the computer executable code. The on-boarding validation criterion may comprise that the computer executable code satisfies static code requirements, that only expected computer resources are used when executing the computer executable code, and/or that no malware is detected in the computer executable code.

The sandbox account may be configured to allow the user to access the computer executable code, and prevent the user from accessing the protected data and a service provisioner. The sandbox validation criterion may comprise an authorisation from the secure provider.

One or more of the sandbox account, the on-boarding account, preparation account and run account may be configured with multi-factor authentication to ensure that the user is authentic. One or more of the sandbox account, on-boarding account, preparation account and run account may be configured to log execution information.

In another aspect of the invention, there is provided a pipeline for securely testing computer executable code in a third-party cloud environment, wherein the pipeline is generated by a process of the invention.

In another aspect of the invention, there is provided a cloud environment comprising a secure portion, the secure portion comprising the pipeline of the invention.

The secure portion may further comprise an experimental build account, the experimental build account configured to receive, from the user or from the secure provider, the request to test computer executable code. The experimental build account may also comprise a virtual private cloud, the virtual cloud may be private such that the experimental build account has no access to a communication network or may be public. When the VPC is public, the experimental build account further comprises a security gateway such that the experimental build account has limited access to a communication network. The experimental build account may comprise a service provisioner configured to determine whether the computer executable code contains any data requests and assist with providing services to the computer executable code. The experimental build account may comprise a pipeline generator configured to generate the pipeline of the invention.

In another aspect of the invention, there is provided computer hardware configured perform a process of the invention, to host a pipeline of the invention or to host a cloud environment of the invention. Computer hardware may include cloud environment hardware, one or more servers, and/or a storage array network.

In another aspect of the invention, there is provided a method of securely testing computer executable code in a third-party cloud environment. The method uses a process of the invention, a pipeline of the invention, a cloud environment of the invention, or the computer hardware of the invention.

BRIEF DESCRIPTION OF THE DRAWINGS

Embodiments of the invention are described below, by way of example, with reference to the following drawings, in which.

DETAILED DESCRIPTION

Figure 1:
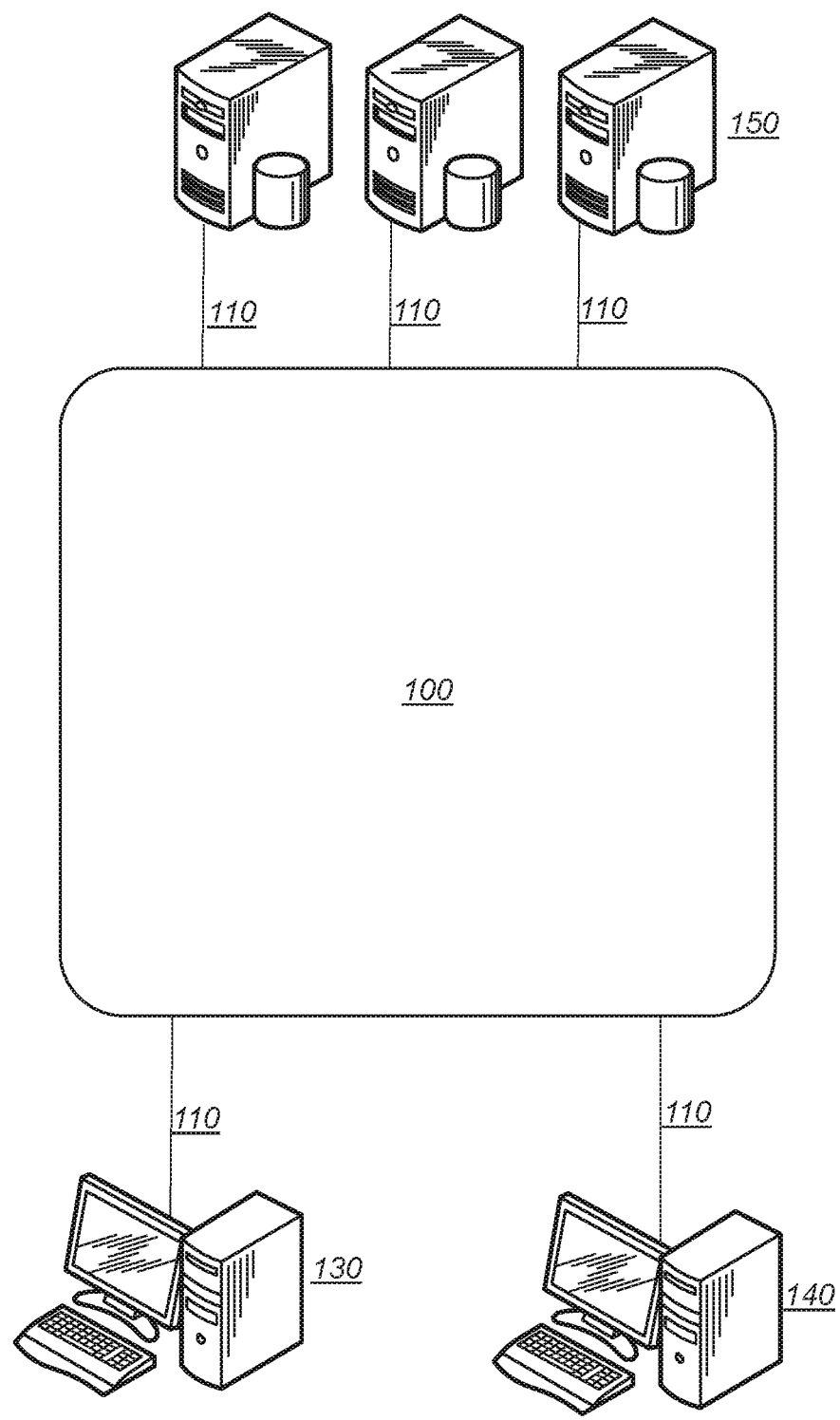
FIG. 1 is a schematic of an exemplary system for implementing a pipeline of the invention, a process for generating a pipeline of the invention, and a method of securely validating computer executable code according to the invention.

FIG. 1 is a schematic illustrating an exemplary system for implementing a method of the invention. As shown in FIG.

1, cloud environment 100 is communicatively coupled via communication network 110 to secure provider 130, one or more users 140, and one or more external providers 150. In some embodiments, communication network 110 may be implemented or facilitated using one or more local or wide-area communications networks, such as the Internet, WiFi networks, WiMax networks, and the like. Generally, communication network 110 is the Internet. Preferably, communication network 110 may utilise encryption (e.g., Secure Sockets Layer) to secure data being transferred over the communication network 110 to the cloud environment 100.

Cloud environment 100 is owned and maintained by a third party, i.e. a party that is not the secure provider 130, not one of the one or more users 140, and not one of the external providers 150. Accordingly, cloud environment 100 is referred to as "a third-party cloud environment". Examples of third-party cloud environments include Amazon Web Services (AWS), Microsoft Azure, Google Cloud Platform, and IMB Cloud. By connecting to a multitude of users 140, cloud environment 100 is able to benefit from economies of scale, thereby making processing and storing large quantities of data in cloud environment 100 efficient.

Typically, cloud environment 100 hosts computer executable code (not shown) which is executed in the cloud environment 100 in response to a request from a user 140. Execution of the computer executable code causes data to be processed, and the output data produced by executing the computer executable code is available for user 140 to access. In this way, the computer resources required for data processing are outsourced from user 140 to cloud environment 100. This is advantageous because it means that user 140 does not have to provision and maintain their own physical computer hardware. Moreover, user 140 can send the request from anywhere, as long as they have connection to cloud environment 100 via communication network 110. Since the communication network 110 is typically the Internet, which is ubiquitous, the accessibility of cloud environment 100 to user 140 is extremely high. This is convenient as user 140 does not have to be physically present at a particular location in order to access cloud environment 100. User 140 can access computer executable code 324 through a web browser or any other appropriate client application residing on a computer.

User 140 of the cloud environment 100 may additionally or alternatively develop computer executable code 324 for hosting and execution in cloud environment 100. In some instances, the computer executable code 324 developed by user 140 may need to be validated in cloud environment 100 before the computer executable code 324 can be hosted in cloud environment 100 or a different cloud environment (not shown). The concept of "validation" includes both ensuring that the computer executable code 324 executes in cloud environment 100 as intended, i.e. testing the computer executable code 324 itself, and ensuring that the computer executable code 324 satisfies security requirements. However, existing third party cloud environments are not currently suitable for validating computer executable code 324, particularly computer executable code 324 that interacts with protected data, as is discussed herein.

When executed, computer executable code 324 may process data or use data. This data is made available to the cloud environment 100 by a data request in the computer executable code 324. Data requests are made by requesting, in the computer executable code 324, a particular service such as access to REST (Representational State Transfer) APIs (Application Programming Interface) or similar communication protocols. REST APIs work by making HTTP requests to GET, PUT, POST and DELETE data. Thus, when the computer executable code 324 makes a request for data, it may do so by making a HTTP GET request to the data source. Such services (and therefore data) may be provided either internally within the cloud environment 100, or externally by one or more external providers 150.

Examples of processing data includes, for instance, performing a mathematical transform via computer executable code 324 on data, or performing statistical analysis via computer executable code 324 on data. Using data includes, for example, accessing a database and using data contained in the database to provide insights into other data. Data that is processed or used by computer executable code 324 is made available to the cloud environment 100 from internally within the cloud environment 100, externally by one or more external provides 150, and/or externally by the secure provider 130.

Secure provider 130 is a special type of user 140 which is not only able to interact with cloud environment 100 in a similar way as user 140 (i.e. send requests to cause computer executable code 324 to be executed in the cloud environment 100, and develop computer executable code 324 to be executed in the cloud environment 100), but is also able to provide services (and therefore data) to cloud environment 100. Accordingly, secure provider 130 may be thought of as a hybrid user/external provider. Secure provider 130 has additional security provisions over the user 140 and the external providers 150 because data provided by the secure provider 130 may be protected data.

Protected data, as referred to herein, is data that requires protecting due to its cognitive content. This means that protected data may have additional security provisions to prevent unauthorised access to data. Moreover, the storage and processing of protected data may be restricted. In some instances, the restriction is caused by local legislation, for example General Data Protection Regulation (GDPR) in the European Union, and the Data Protection Act 2018 in the United Kingdom.

Protected data may include personal data, i.e. information relating to an identified or identifiable natural person. For example, protected data may include a name, an identification number, location data, an online identifier or one or more factors specific to the physical, physiological, genetic, mental, economic, cultural or social identity of a natural person. Additionally or alternatively, protected data may include financial data.

Validating computer executable code 324 that interacts with protected data cannot be performed in a typical cloud environment in a secure manner because of the inherent security risks. One such security risk is that the interactive access provided to parties other than the secure provider 130 (e.g. user 140, one or more external providers 150 or third party provider) is misused, enabling the parties other than the secure provider 130 to access the protected data and/or execute the computer executable code with the protected data. Another security risk is that the protected data is exposed to user 140 within cloud environment 100. A further security risk is that protected data is leaked to outside cloud environment 100.

Figure 2:
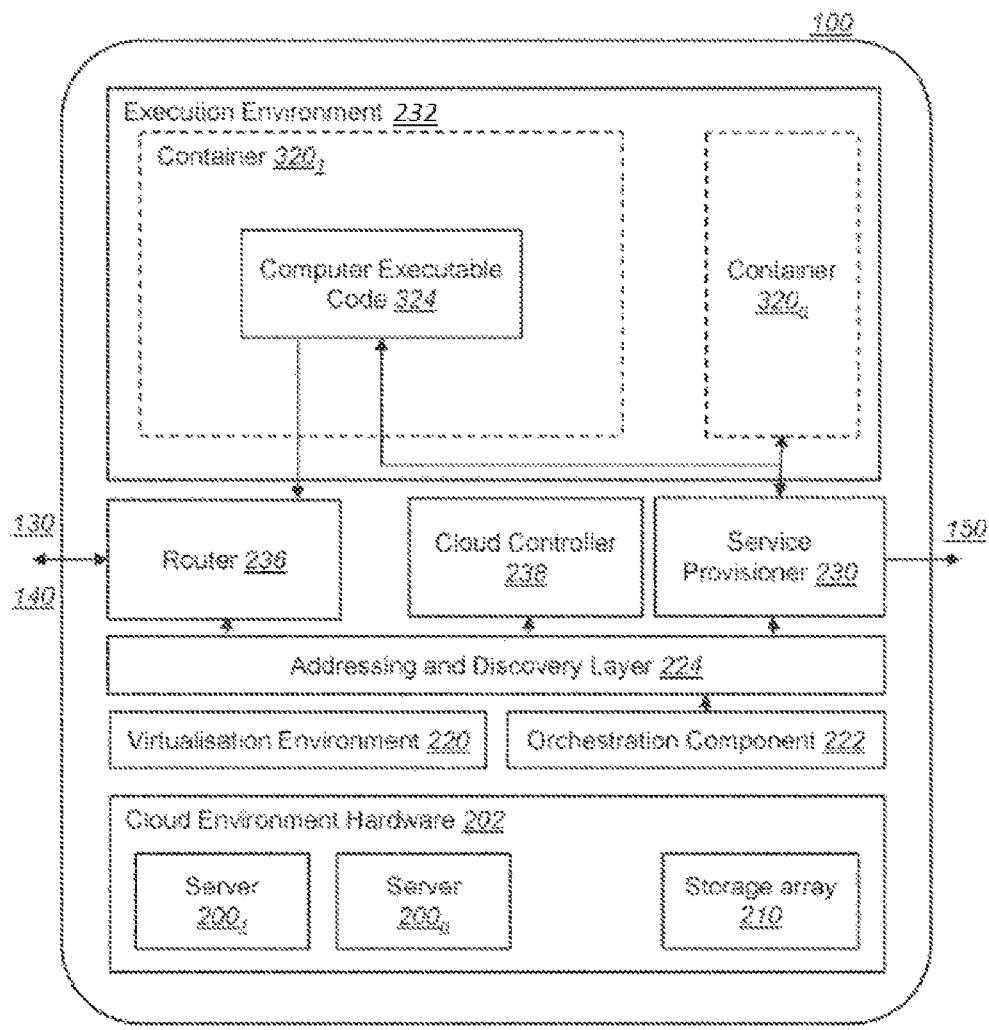
FIG. 2 is a schematic of an exemplary third-party cloud environment for implementing a pipeline of the invention, a process for generating a pipeline of the invention, and a method of securely validating computer executable code according to the invention.

FIG. 2 shows an exemplary third-party cloud environment 100 for implementing a method of the invention. As seen in FIG. 2, cloud environment 100 comprises cloud environment hardware 202 that can be invoked to instantiate data processing, data storage, or other computer resources using cloud computing hardware 202 for a limited or defined duration. Cloud environment hardware 202 may comprise one or more servers $200_1$ to $200_n$, and a storage array network 210, as well as any other suitable hardware. Cloud environment hardware 202 may be configured to provide a virtualisation environment 220 that supports the execution of a plurality of virtual machines 310 (not shown) across the one or more servers $200_1$ to $200_n$. As described in relation to FIG. 3, the plurality of virtual machines 310 provide various services and functions for cloud environment 100.

Virtualisation environment 220 of FIG. 2 includes orchestration component 222 that monitors the cloud environment hardware 202 resource consumption levels and the requirements of cloud environment 100 (e.g., by monitoring communications routed through addressing and discovery layer 224), and provides additional cloud environment hardware 202 to cloud environment 100 as needed. For example, if cloud environment 100 requires additional virtual machines 310 to host new computer executable code 324, orchestration component 222 can initiate and manage the instantiation of the virtual machines 310 on the one or more servers $200_1$ to $200_n$ to support such needs. In one example implementation, virtualisation environment 220 may be implemented by running Amazon Elastic Compute Cloud (Amazon EC2) on servers $200_1$ to $200_n$. It should be recognised that any other virtualization technologies, including VMware ESX and Microsoft Hyper V virtualization technologies, may alternatively be utilised.

Figure 3:
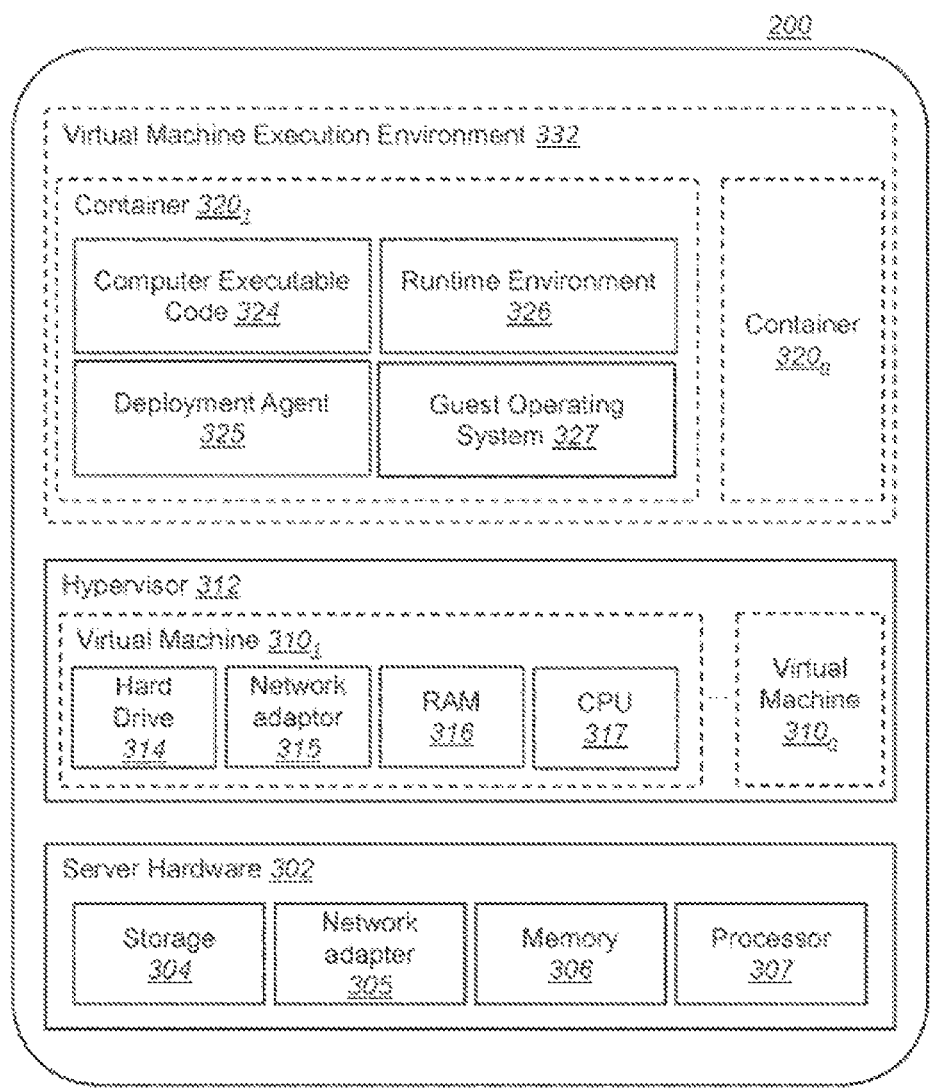
FIG. 3 is a schematic of an exemplary computer hardware for implementing a pipeline of the invention, a process for generating a pipeline of the invention, and a method of securely validating computer executable code according to the invention.

Cloud environment 100 supports an execution environment 232 that comprises a plurality of virtual machines 310 (or plurality of containers 320, as is discussed in relation to FIG. 3) instantiated to host deployed computer executable code 324. For example, deployment by user 140 or by secure provider 130 of computer executable code 324 to the cloud environment 100 results in the hosting of computer executable code 324 in virtual machine $310_1$ and/or container $320_1$, of execution environment 232.

Computer executable code 324 can access internal services provided by cloud environment 100 as well as external services from one or more external providers 150 and/or from secure provider 130. Services may include, for example, accessing a REST API, a custom database, a relational database service (e.g., MySQL, etc.), monitoring service, background task scheduler, logging service, messaging service, memory object caching service and the like. A service provisioner 230 serves as a communications intermediary between these available services (e.g., internal services and external services) and other components of cloud environment 100 (e.g., cloud controller 238, router 236, containers 320) and assists with provisioning available services to computer executable code 324 during the deployment process.

Service provisioner 230 may maintain a stub for each service available to cloud computing environment 100. Each stub itself maintains service provisioning data for its corresponding service, such as a description of the service type, service characteristics, login credentials for the service (e.g., root username, password, etc.), a network address and port number of the service, and the like. Each stub is configured to communicate with its corresponding service using an API or similar communications protocol.

Referring back to FIG. 2, addressing and discovery layer 224 provides a common interface through which components of cloud computing environment 100, such as service provisioner 230, cloud controller 238, router 236 and containers 320 in the execution environment 232 can communicate. For example, service provisioner 230 communicates through addressing and discovery layer 224 to broadcast the availability of services and to propagate service provisioning data for such services during deployment of computer executable code 324 in cloud environment 100.

Cloud controller 238 is configured to orchestrate the deployment process for computer executable code 324 that is submitted to cloud environment 100 by user 140 or secure provider 130. In particular, cloud controller 238 receives computer executable code 324 submitted to cloud computing environment 100 from user 140 or secure provider 130 and, as further detailed below, interacts with other components of cloud environment 100 to call services required by the computer executable code 324 and package the computer executable code 324 for transmission to available containers 320.

Typically, once cloud controller 238 successfully orchestrates the computer executable code 324 in container 320, a secure provider 130 and/or a user 140 can access the computer executable code through a web browser or any other appropriate client application residing on a computer. Router 236 receives the web browsers access request (e.g., a uniform resource locator or URL) and routes the request to container 320 which hosts the computer executable code 324.

It should be recognized that the embodiment of FIG. 2 is merely exemplary and that alternative cloud environment architectures may be implemented consistent with the teachings herein. For example, while FIG. 2 implements cloud computing environment 100 on cloud environment hardware 202, it should be recognized that cloud environment 100 may be implemented by a third-party in an alternative manner and on top of any type of hardware.

FIG. 3 is a schematic of an exemplary server 200 for implementing a method of the invention. In particular, FIG. 3 depicts server 200 comprising server hardware 302 and virtual machine execution environment 332 having containers 320 with computer executable code 324. The server hardware 302 may include local storage 304, such as a hard drive, network adapter 305, system memory 306, processor 307 and other I/O devices such as, for example, a mouse and keyboard (not shown).

A virtualisation software layer, also referred to as hypervisor 312, is installed on top of server hardware 302. Hypervisor 312 supports virtual machine execution environment 332 within which containers 320 may be concurrently instantiated and executed. In particular, each container 320 provides computer executable code 324, deployment agent 325, runtime environment 326 and guest operating system 327 packaged into a single object. This enables container 320 to execute computer executable code 324 in a manner which is isolated from the physical hardware (e.g. server hardware 302, cloud environment hardware 202), allowing for consistent deployment regardless of the underlying physical hardware.

As shown in FIG. 3, virtual machine execution environment 332 of server 200 supports a plurality of containers $320_1$ to $320_n$. Docker is an example of a virtual machine execution environment 332 which supports containers 320. For each container $320_1$ to $320_n$, hypervisor 312 manages a corresponding virtual machine $310_1$ to $310_n$ that includes emulated hardware such as virtual hard drive 314, virtual network adaptor 315, virtual RAM 316, and virtual central processing unit (CPU) 317. For example, virtual machine 310 may function as an equivalent of a standard x86 hardware architecture such that any x86 supported operating system, e.g., Microsoft Windows, Linux, etc., may be installed as a guest operating system 327 to execute computer executable code 324 for container 320. Container 320 may be provided by virtualisation environment 220, as previously discussed for FIG. 2.

Hypervisor 312 is responsible for transforming I/O requests from guest operating system 327 to virtual machines 310, into corresponding requests to server hardware 302. In FIG. 3, guest operating system 327 of container 320 supports the execution of deployment agent 325, which is a process or daemon that communicates (e.g., via addressing and discovery layer 224) with cloud controller 238 to receive and unpack computer executable code 324 and its deployment package. Deployment agent 325 also communicates with router 236 to provide network routing information for computer executable code 324 that have been deployed in container 320. Guest operating system 327 further supports the execution of runtime environment 326 within which computer executable code 324 is executed.

It should be recognized that the various layers and modules described with reference to FIG. 3 are merely exemplary, and that other layers and modules may be used with the same functionality without departing from the scope of the invention. It should further be recognized that other virtualised computer architectures may be used, such as hosted virtual machines.

Secure Portion

Figure 4:
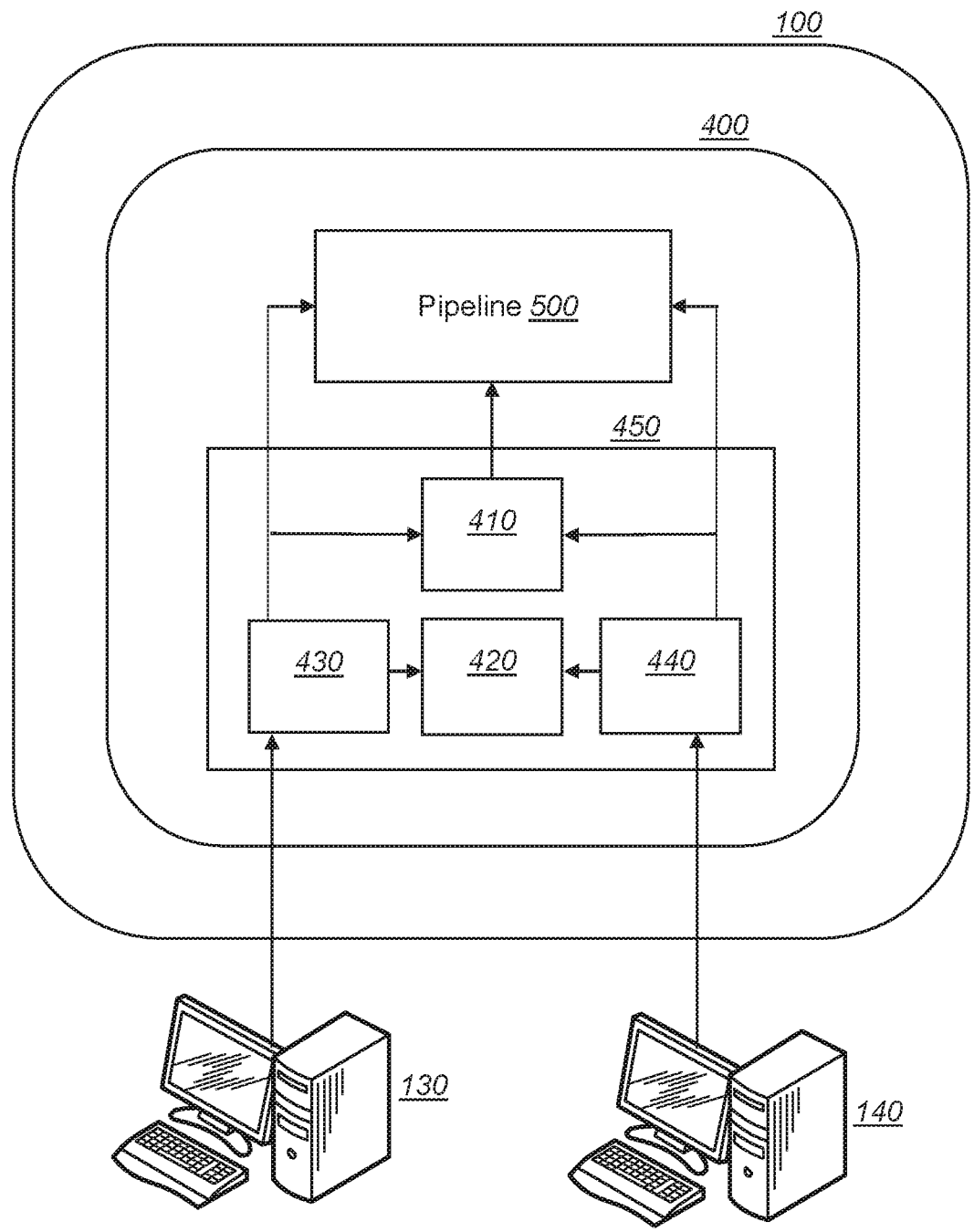
FIG. 4 is a schematic of a third-party cloud environment according to the invention having a pipeline for securely validating computer executable code.

With reference to FIG. 4, secure portion 400 is provided in cloud environment 100 to implement a pipeline of the invention, a process for generating a pipeline of the invention, and a method of securely validating computer executable code according to the invention. Secure portion 400 is a portion of cloud environment 100 which is under the control of secure provider 130. In other words, secure provider 130 has administrative rights over secure portion 400 of cloud environment 100.

Secure portion 400 is hosted by cloud environment hardware 202 on one or more servers 200$_1$ to 200$_n$. For each server 200$_1$ to 200$_n$, secure portion 400 is hosted by server hardware 302 on one or more virtual machines 310$_1$ to 310$_n$. Further, one or more virtual machines 310$_1$ to 310$_n$ may host one or more containers 320$_1$ to 320$_n$, where each of the one or more containers 320$_1$ to 320$_n$, comprises at least a part of secure portion 400.

Secure portion 400 may be communicatively coupled to virtualisation environment 200, orchestration component 222, addressing and discovery layer 224, router 236, cloud controller 238, service provisioner 230 and execution environment 232. Additionally or alternatively, the secure portion may comprise one or more of virtualisation environment 200, orchestration component 222, addressing and discovery layer 224, router 236, cloud controller 238, service provisioner 230 and execution environment 232.

Secure portion 400 comprises one or more accounts (e.g. experimental build account 450). The term "account", as used herein, refers to a user account, i.e. an established connection between the third party of cloud environment 100 and user 140 or secure provider 130. Each account dictates the level of access that user 140 or secure provider 130 has to various modules and processes of secure portion 400 of cloud environment 100, as is discussed in detail below. By implementing more than one account, the secure portion 400 provides increased security since each account has to be breached separately. In particular, having more than one account reduces the overall accessibility to the secure portion 400 by the user 140, lowering the chance of protected data being leaked outside the secure portion 400. In certain cloud environments 100, there are ways to circumvent the need to breach each account separately, such as performing a higher level security breach. In one example where cloud environment 400 is AWS and the accounts are AWS account, the AWS control plane would have to be breached to gain access to each of the separated AWS accounts. However, higher level security breaches are much more difficult to perform, which means that the chance of a breach is greatly reduced, and security is increased.

Creation of one or more accounts is provisioned by the third party of cloud environment 100 in response to a manual request from user 140 or secure provider 130, or in response to an automated request from the secure portion 400. Each of the one or more accounts can be configured to provide a predetermined level of access to various modules and processes of cloud environment 100 for user 140 or secure provider 130. The predetermined level of access may be set at creation of the account and/or may be modified subsequently by secure provider 130.

As shown in FIG. 4, secure portion 400 of cloud environment 100 comprises experimental build account 450. Experimental build account 450 is configured to manage computer executable code received from user 140 or secure provider 130 for validation. Note that the term "experimental build" is an appellative and is not intended to imply features or functionality beyond that described herein. The predetermined level of access of experimental build account 450 is preferably that user 140 does not have administrative access to any module or process in secure portion 400. This is so user 140 cannot misuse secure portion 400, and enable parties other than the secure provider 130 to access the protected data and/or execute the computer executable code with protected data.

Experimental build account 450 may be created in response to a manual request from secure provider 130 when a new user 140 desires to validate computer executable code, or may preferably be created in response to an automated request from secure portion 400. Experimental build account 450 may be user-specific and experiment-specific. The term "experiment", as used herein, is intended to refer to the process of validating computer executable code, such that experimental build account 500 can be used for validating a particular computer executable code for a particular user 140. Alternatively, the experimental build account 500 may be only user-specific, such that the experimental build account 500 can be used for validating a plurality of different computer executable codes from a particular user 140.

Experimental build account 450 comprises a VPC (virtual private cloud). A VPC is a virtual network dedicated to experimental build account 450 which is logically isolated from other virtual networks and therefore other accounts in cloud environment 100. Secure provider 140 specifies an IP address range for the VPC, add subnets, associate security groups, and configure route tables for the VPC. The VPC of experimental build account 450 may be private, i.e. cannot be connected to communication network 110. Moreover, experimental build account 450 may have controls to prevent access to communication network 110 being added to experimental build account 450. By using a VPC and/or controls to prevent access to communication network 110 being added to experimental build account 450, user 140 is unable to leak protected data outside of secure portion 400 via the computer executable code or otherwise. Alternatively, the VPC of experimental build account 450 may be public, i.e. can be connected to communication network 110. In such embodiments, an additional security gateway, such as a Mulesoft gateway, is implemented in secure portion 400 to ensure that protected data is not being leaked outside secure portion 400.

Experimental build account 450 is accessible to user 140 via a first virtual desktop 440 in experimental build account 450, and to secure provider 130 via a second virtual desktop 430 in experimental build account 450. Before validation of computer executable code can commence, the computer executable code is sent from user 140 to experimental build account 450. When the computer executable code for validation is received from user 140, the first virtual desktop 440 is used by the user 140 to interact with the computer executable code for validation, and the second virtual desktop 430 is used by the secure provider 130 to support and configure any requirements to deliver the validation of the computer executable code. In order to provide increased security, the ability to copy files to the clipboard of virtual desktops 430, 440 is disabled. Each of the virtual desktops 430, 440 may be provisioned by one or more virtual machines $310_1$ to $320_n$, and may be hosted in one of the plurality of containers $320_1$ to $320_n$. For example, virtual desktop 430 may be provided by guest operating system 327 of first container $320_1$, and virtual desktop 440 may be provided by guest operating system 327 of second container 3022. Containerisation enables the computer executable code to be fully isolated from modules and processes external to secure portion 400. In another example, each of the virtual desktops 430, 440 may be an Amazon Workspace.

Access by user 140 to experimental build account 450, and thus to virtual desktop 440, is time restricted to prevent misuse of the protected data by user 140. In one example, the access is time restricted in that access is only available for a predetermined time period. The predetermined time period may be, for example, 10 minutes, 30 minutes, 1 hour, 3 hours, 1 day, 3 days, etc., depending on the nature of the computer executable code and the time taken to process the protected data. In another example, access is only available during predetermined times of the day and/or predetermined days of the week. For example, the access may be restricted to between 9 AM and 5 PM on Monday, Tuesday, Wednesday, Thursday and Friday.

Experimental build account 450 is configured to receive, from user 140 or secure provider 130, a request to validate computer executable code. The request may be viewable on virtual desktop 430 and on virtual desktop 440. When the computer executable code to be validated is received from user 140 to experimental build account 450, the computer executable code is stored on the one or more virtual machines $320_1$ to $320_n$ which provision virtual desktop 440 for user 140. Secure provider 130 does not have access to virtual desktop 440 and therefore the stored computer executable code.

The computer executable code is sent to pipeline generator 410, which is contained within experimental build account 450. Pipeline generator 410 is responsible for generating a pipeline 500 for securely validating the computer executable code (i.e. a software pipeline). The process for generating pipeline 500 is described in further detail below. Generating pipeline 500 is performed automatically by pipeline generator 410 upon receipt of the computer executable code. An example pipeline generator 410 is AWS CodePipeline.

In some embodiments, computer executable code is sent to service provisioner 420, which is contained within experimental build account 450, at the same time as being sent to pipeline generator 410. Service provisioner 420 is has similar functionality to service provisioner 230 of FIG. 2. Thus, service provisioner 420 determines whether the computer executable code contains any data requests and assists with provisioning available services to the computer executable code. This includes data requests for protected data from secure provider 130. However, in other embodiments, computer executable code is not sent to service provisioner 420 until the computer executable code progresses past the sandbox account 505 in pipeline 500, as is further discussed below. An example service provisioner 420 is AWS CodeCommit.

Once pipeline 500 has been generated, the computer executable code is sent to pipeline 500 for securely validating the computer executable code. Any cognitive data resulting from executing the computer executable code in pipeline 500, particularly output data, is stored in a secure bucket (not shown) in secure portion 400. The term "bucket" is intended to refer to a resource in an object storage service, such as Amazon S3. The default security settings for the secure bucket is to deny any access requests by user 140. However, a break glass policy may be implemented in order to allow user 140 to override certain security controls in the event of an emergency (e.g. a critical error in processing the computer executable code). The data contained in the secure bucket is preferably encrypted.

Secure Validation Pipeline

Figure 5:
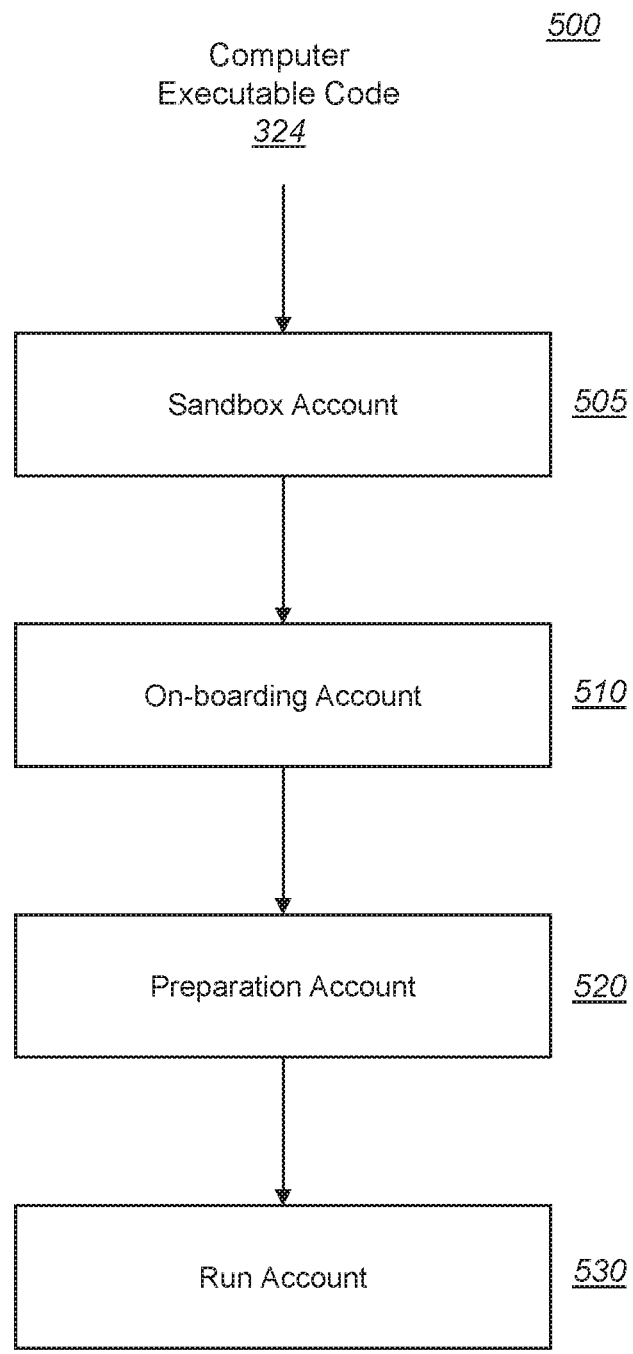
FIG. 5 is a flow diagram of an exemplary pipeline for securely validating computer executable code in a third-party cloud environment according to the invention.

FIG. 5 is a flow diagram of pipeline 500 that is configured for securely validating computer executable code in cloud environment 100. As can be seen in FIG. 5, pipeline 500 comprises a plurality of accounts (i.e. sandbox account 505, on-boarding account 510, preparation account 520, and run account 530). The plurality of accounts are connected in series in order to form pipeline 500. The computer executable code passes through each of the plurality of accounts sequentially.

Each of the plurality of accounts provides user 140 with a different accessibility to the computer executable code and/or to protected data from secure provider 130. This accessibility is referred to herein as a predetermined user access level. Generally speaking, accounts in which user 140 has better accessibility to the computer executable code have little or no access to protected data from secure provider 130. Likewise, accounts in which user 140 has no accessibility to the computer executable code have comprehensive access to protected data from secure provider 130.

Accounts where user 140 has better accessibility to the computer executable code process the computer executable code before accounts where user 140 has little or no accessibility to the computer executable code. This is advantageous because each account in pipeline 500 provides individual security checks for the computer executable code, and the accumulation of these individual security checks provides an overall improved level of security in cloud environment 100. Moreover, by decreasing the accessibility of the computer executable code to user 140 as the computer executable code moves through the pipeline, the opportunity for user 140 to introduce a new security threat is limited as accessibility to the protected data increases. This means that the chance of protected data being leaked is greatly reduced.

Each of the plurality of accounts comprises a VPC (virtual private cloud). As mentioned previously, a VPC is a virtual network dedicated to the respective account which is logically isolated from other virtual networks and therefore other accounts in cloud environment 100. The VPC of each of the plurality of accounts is private, i.e. cannot be connected to communication network 110, in order to provide additional security. Moreover, the plurality of accounts have controls to prevent access to communication network 110 being added. By using a VPC and/or controls to prevent access to communication network 110 being added, user 140 is unable to leak protected data outside of secure portion 400 via the computer executable code or otherwise.

Each of the plurality of accounts is configured with multi-factor authentication to ensure that a user attempting to access an account is authenticated to do so. If user 140 fails to authenticate themselves via the multi-factor authentication, then user 140 is blocked from accessing the account until a review is performed by secure provider 130. Multi-factor authentication may be provided by, for example, Symantec VIP.

Each of the plurality of accounts is configured to log data traffic within the particular account when executing the computer executable code. For example, each account may log data traffic of outgoing data requests, including requests for services, such as to the one or more external providers 150 or to the secure provider 130 for protected data. The data traffic logs may be made available to the user 140 and/or the secure provider 130, depending on the configuration of the particular account, as further discussed herein.

Each of the plurality of accounts is configured to log execution information within the particular account from executing the computer executable code. The execution logs may contain, for example, information on one or more failures that occurred when executing the computer executable code, in addition to or as an alternative to information on one or more successes that occurred when executing the computer executable code. The execution logs may be made available to the user 140 and/or the secure provider 130, depending on the configuration of the particular account, as further discussed herein. As discussed herein, any cognitive data resulting from executing the computer executable code in pipeline 500, including output data, is not stored in the accounts, but in a secure bucket in secure portion 400.

Exemplary pipeline 500 of FIG. 5 comprises four accounts; sandbox account 505, on-boarding account 510, preparation account 520 and run account 530. However, it should be appreciated that not all four accounts are required for the invention. A minimum of two accounts should be present in pipeline 500. It should also be appreciated that other numbers of accounts may be used, such as three accounts, or five or more accounts. Example account configurations are provided below. Note that the terms "sandbox", "on-boarding", "preparation" and "run" are appellative and are not intended to imply features or functionality beyond that described herein.

Sandbox Account

Pipeline 500 of FIG. 5 includes sandbox account 505, which receives the computer executable code first in pipeline 500, before on-boarding account 510. Sandbox account 505 offers user 140 an initial testing environment for the computer executable code which does not have access to service provisioner 420 and limits the output data and logs sent to secure provider 130. Sandbox account 505 has the best accessibility for user 140 to the computer executable code of the accounts in pipeline 500 and no access to protected data from secure provider 130. Thus, the predetermined user access level of sandbox account 505 is to allow the user to access the computer executable code. By "access" it is meant that user 140 can install, view, retrieve, and modify the computer executable code in sandbox account 505. Allowing user 140 to modify the computer executable code in sandbox account 505 enables user 140 to configure the computer executable code appropriately for testing in pipeline 500, and also enables user 140 to identify and fix any errors that arise from transmitting the computer executable code to the secure portion 400 of cloud environment 100. The predetermined user access level of sandbox account 505 is also to prevent the user from accessing the protected data and service provisioner 420. By "prevent" it is meant that user 140 has no access whatsoever to the protected data, via a service request or otherwise, or to the service provisioner 420.

Sandbox account 505 logs execution information but does not allow secure provider 130 to access to the execution logs. This enables user 140 to identify and fix any errors in the computer executable code before submitting the computer executable code to the service provisioner 420. Sandbox account 505 nevertheless logs data traffic and allow secure provider 130 to access the data traffic logs as this ensures that user 140 is not prematurely gaining access to the protected data. User 140 does not have access to either the execution logs or the data traffic logs.

Computer executable code is executed in sandbox account 505 using dummy data instead of protected data. The dummy data may be provided to sandbox account 505 by secure provider 130 or by user 140. Dummy data has the same structure as the protected data, but the cognitive content of the data is not protected. In some embodiments, dummy data may be fabricated by user 140 or secure provider 130. In other embodiments, dummy data may be pseudonymised data in which the data structure remains the same as the protected data, but where personal data is replaced by one or more artificial identifiers or pseudonyms.

Sandbox account 505 is configured to store the computer executable code until a sandbox validation criterion is met, when sandbox account 505 transmits the computer executable code from sandbox account 505 to on-boarding account 510. The sandbox validation criterion comprises an authorisation from secure provider 130. This authorisation may take the form of a manual authorisation from a human user of secure provider 130 in order to provide manual intervention for validating computer executable code in pipeline 500. The sandbox validation criterion is based on the one or more security checks described in relation to on-boarding account 510 and preparation account 520 below, since these security checks are performed in sandbox account 505. However, manual authorisation from a human user of secure provider 130 is required before transmitting the computer executable code to on-boarding account 510, regardless of the outcome of the one or more security checks.

On-Boarding Account

On-boarding account 510 is positioned in pipeline 500 between sandbox account 505 and preparation account 520. On-boarding account 510 has increased user access to protected data from secure provider 130 compared to sandbox account 505 because user is allowed to access service provisioner 420. Accordingly, the predetermined user access level of on-boarding account 510 is to allow user 140 to access the computer executable code. Allowing user 140 to modify the computer executable code in on-boarding account 510 enables user 140 to configure the computer executable code appropriately for validation in pipeline 500, and also enables user 510 to identify and fix any errors that arise from transmitting the computer executable code to the secure portion 400 of cloud environment 100. The predetermined user access level of on-boarding account 510 is also to prevent user 140 from accessing the protected data. This is to prevent a leak of protected data from outside the secure portion 400 and/or the cloud environment 100 via the computer executable code. However, as mentioned before, user 140 is allowed to access service provisioner 420.

On-boarding account 510 cannot be connected to communication network 110 (e.g. the Internet). However, on-boarding account 510 is configured with access to one or more external providers 150 which are stored in a whitelist database in the secure portion 400. The whitelist database is maintained by secure provider 130. This access enables user 140 to install software from the one or more external providers 150, access remote data libraries from the one or more external providers 150, and the like.

Computer executable code is executed in on-boarding account 510 using dummy data instead of protected data. The dummy data may be provided to on-boarding account 510 by secure provider 130 or by user 140. Dummy data has the same structure as the protected data, but the cognitive content of the data is not protected. In some embodiments, dummy data may be fabricated by user 140 or secure provider 130. In other embodiments, dummy data may be pseudonymised data in which the data structure remains the same as the protected data, but where personal data is replaced by one or more artificial identifiers or pseudonyms. Pseudonymised data is required when the computer executable code is a machine learning algorithm as these algorithms rely on interactive access with data which is similar to the protected data in order to generate a machine learning model for execution in subsequent accounts in pipeline 500.

On-boarding account 510 is configured to perform one or more security checks on the computer executable code. The one or more security checks in the on-boarding account generally check assets of the computer executable code, rather than assessing the runtime of the computer executable code. Accordingly, the one or more security checks comprise static code analysis, library checks, malware scanning, and the like. Static code analysis is the analysis of computer executable code without executing the computer executable code. Static code analysis may involve individual statements in the computer executable code to the complete source code of the computer executable program. Library checks are security check which determine which computer resources are being used by on-boarding account 510 during execution of the computer executable code. Such resources may be in cloud environment 100, or may be external to cloud environment 100, such as the one or more external providers 150 and/or the secure provider 130. Malware scanning is the identification of malware, i.e. computer executable code that is specifically designed to disrupt, damage or gain unauthorised access to any part of cloud environment 100, in the computer executable code.

On-boarding account 510 is configured to log data traffic and/or log execution information. Both the data traffic logs and the execution logs are preferably available to secure provider 130, but not available to user 140. User 140 is provided with a restricted or limited version of the execution logs to assist the user 140 in determining that the computer executable code executed correctly. For example, the execution logs may be limited to information on failures that occurred when executing the computer executable code where the failure is not due to failing a security check or where the failure does not reveal protected data.

On-boarding account 510 is configured to transmit the computer executable code from on-boarding account 510 to preparation account 520, but only if an on-boarding validation is met. The on-boarding validation criterion is based on the one or more security checks performed on the computer executable code in on-boarding account 510. Accordingly, the on-boarding validation criterion may be that the computer executable code satisfies static code requirements, that only expected computer resources being used when executing the computer executable code, or that no malware in the computer executable code. In some embodiments, only one of these on-boarding validation criterion needs to be satisfied before on-boarding account 510 transmits the computer executable code from on-boarding account 510. In other embodiments, more than one of the on-boarding validation criteria needs to be satisfied before the on-boarding account 510 transmits the computer executable code from on-boarding account 510.

The on-boarding validation varies depending on the nature of the computer executable code. When the computer executable code is a machine learning algorithm, on-boarding validation criterion other than those described above may be used. For example, machine learning model performance metrics, such as genie score, need to meet certain predetermined levels before the on-boarding account 510 transmits the computer executable code from the on-boarding account 510.

Preparation Account

Preparation account 520, which is present in pipeline 500, is intermediate to on-boarding account 510 and run account 530. The purpose of preparation account 520 is to execute the computer executable code in a fully automated manner before the user is given access to execute the computer executable code with the protected data. Accordingly, the predetermined user access level of preparation account 520 is to prevent access the protected data and prevent access the computer executable code.

Preparation account 520 is configured to perform one or more security checks on the computer executable code. The one or more security checks in the on-boarding account generally check assets of the computer executable code, rather than assessing the runtime of the computer executable code. Accordingly, the one or more security checks may comprise static code analysis, library checks, malware scanning, and the like. The one or more security checks performed by the preparation account 520 may be the same as or different from the one or more security checks performed by the on-boarding account 510. Even when the same security checks are performed in on-boarding account 510 and preparation account 520, there is a difference in that in the preparation account 520 user 140 does not have access to the computer executable code.

Similar to run account 530, preparation account 520 is configured to log data traffic within run account 530 when executing the computer executable code. Moreover, preparation account 520 may be configured to analyse the data traffic to identify one or more data requests. For example, preparation account 520 can identify outgoing data requests, including requests for services, such as to the one or more external providers 150 or to the secure provider 130 for protected data. Moreover, preparation account 520 can identify incoming data requests, including requests from user 140. This is to determine whether there are any unexpected requests being sent or received by computer executable code which may pose a security risk. Additionally or alternatively, the data traffic logs may be sent to a monitoring service which collects and monitors the logs, collects and tracks metrics, sets alarms, automatically reacts to changes in outgoing data requests, and the like. An example monitoring service is Amazon CloudWatch.

Preparation account 520 is configured to identify whether any of the one or more data requests are invalid. For example, run account 530 may identify a data request to external provider 150 which is not a trusted external provider 150. To this end, preparation account 520 may store a "whitelist" of trusted external providers 150 to check the data requests being made by the computer executable code. In another example, preparation account 520 may identify if a data request for protected data is requesting more data than is necessary for computer executable code.

When the one or more data requests comprise requests for accessing an API, preparation account 520 is configured to simulate one or more APIs corresponding to APIs being requested. Preparation account 520 provides this simulation this in the same way as service provisioner 230, by maintaining a stub for each service being requested. Each stub itself maintains service provisioning data for its corresponding service, and may also maintain the requested data. This is useful because preparation account 520 does not have access to communication network 110 (e.g. the Internet) in order to access an API. Put another way, the Internet access is stubbed for the preparation account 520.

Preparation account 520 is configured to log execution information. The execution log is made available to the secure provider 130, but not available to user 14

On-boarding account 510 is configured to transmit the computer executable code from on-boarding account 510 to preparation account 520 if the on-boarding validation criterion is met. Then, preparation account 520 is configured to transmit the computer executable code from preparation account 520 to run account 530 if a preparation validation criterion is met.

The preparation validation criterion is based on the one or more security checks performed on the computer executable code in preparation account 520. Accordingly, the preparation validation criterion may be that the computer executable code satisfies static code requirements, that only expected computer resources being used when executing the computer executable code, or that no malware in the computer executable code. In some embodiments, only one of these preparation validation criterion needs to be satisfied before preparation account 520 transmits the computer executable code from preparation account 520. In other embodiments, more than one of the preparation validation criteria needs to be satisfied before the preparation account 520 transmits the computer executable code from preparation account 520.

Depending on the nature of the computer executable code and the protected data, it may be useful to have a plurality of intermediate accounts (i.e. a plurality of preparation accounts), each with different second preparation validation criterion.

Run Account

Run account 530 is the last account in pipeline 500 to receive the computer executable code. Like preparation account 530, run account 530 executes the computer executable code in a fully automated manner before, however in run account 520 the computer executable code executes with protected data. This means that run account 530 has no accessibility for user 140 to the computer executable code and the best accessibility to protected data from secure provider 130 of the accounts in pipeline 500. Accordingly, the predetermined user access level of run account 530 is to allow the user to execute the computer executable code with the protected data and prevent the user from accessing the computer executable code.

Run account 530 is configured to provide the same security checks as the on-boarding account 510, and any other account in pipeline 500, to ensure that there are no changes in the computer executable code. In addition, run account 530 is configured with one or more security checks that assess the runtime of the computer executable code. Accordingly, run account 530 may be configured to log runtime information. User 140 and secure provider 130 may have access to the runtime logs to determine the result of validating the computer executable code. User 140 may be provided with a restricted or limited version of the runtime logs to assist the user 140 in determining that the computer executable code executed correctly. For example, the runtime logs may be limited to ensure that user 140 does not access protected data. The security checks provided by run account 530 are used, alone or in combination, to determine if validation of the computer executable code has been successful.

Run account 530 is configured to log data traffic within run account 530 when executing the computer executable code. Moreover, run account 530 is configured to analyse the data traffic to identify one or more data requests. For example, run account 530 may identify outgoing data requests, including requests for services, such as to the one or more external providers 150 or to the secure provider 130 for protected data. Moreover, run account 530 identifies incoming data requests, including requests from user 140. This is to identify whether there are any unexpected requests being sent or received by computer executable code which may pose a security risk. The data traffic logs are made available to the secure provider 130, but not available to user 140. Additionally or alternatively, the data traffic logs are sent to a monitoring service which collects and monitors the logs, collects and tracks metrics, sets alarms, automatically reacts to changes in outgoing data requests, and the like. An example external monitoring service is Amazon CloudWatch.

Run account 530 is configured to provide visualisation of the data traffic between run account 530 and user 140, secure provider 130, and/or one or more external providers 150. The visualisation is viewable on virtual desktop 430 of secure provider 130 to assist secure provider 130 in determining whether any of the data flows are unusual and/or pose a security risk. Optionally, the visualisation is viewable on virtual desktop 440 of user 140 to assist user 140 in determining whether the computer executable code has executed correctly. The visualisation in the form of a data traffic flow diagram which shows icons depicting run account 530, user 140, secure provider 130 and one or more external providers 150, and the data flows therebetween. The visualisation depicts the one or more data requests using colour, shape and/or size to draw attention to the requests.

Run account 530 is configured to identify whether any of the one or more data requests are invalid. For example, run account 530 may identify a data request to external provider 150 which is not a trusted external provider 150. To this end, run account 530 stores a "whitelist" of trusted external providers 150. The whitelist is maintained by secure provider 130. In another example, run account 530 identifies if a data request for protected data is requesting more data than is necessary for computer executable code. When run account 520 detects an invalid data request, run account 520 is configured to intercept the invalid data request. In this way, run account 520 provides managed access to communication network 110 (e.g. the Internet).

Run account 530 is configured to log execution information. The execution log is made available to the secure provider 130, but not available to user 140.

Run account 520 is be configured to restrict user 140 from retrieving output data, i.e. the data resulting from executing the computer executable code with the protected data, from run account 520. This is to prevent derivatives of the protected data, which itself may be protected data, from being accessed by user 140.

In one example, run account 520 is configured to prevent user 140 from obtaining a protected subset of the output data from run account 520, but enables user 140 to retrieve an unprotected subset of the output data. For example, the unprotected subset of the output data may comprise only a summary of the output data. Alternatively, the unprotected subset of the output data may comprise a visual report provided to user 140 via cloud environment 100. The visual report allows user 140 to determine if validation of computer executable code has been successful without revealing protected data to user 140.

Example Account Configuration

An exemplary selection of attributes, including access to logs and key controls, for each of the plurality of accounts is provided in Table 1. Each of the attributes is discussed in more detail in the respective account section above.

In certain embodiments, pipeline 500 comprises two accounts; a first account and a second account. In such embodiments, the first account is configured with a first predetermined user access level to the protected data and the computer executable code, and the second account is configured with a second predetermined user access level to the protected data and the computer executable code. The second predetermined user access level has reduced access to the computer executable code and/or increased access to the protected data compared to the first predetermined user access level.

In one example of pipeline 500 having two accounts, the first account is sandbox account 505 and the second account is on-boarding account 510, and the first predetermined criterion is the sandbox validation criterion. In another example of pipeline 500 having two accounts, the first account is preparation account 520 and the second account is run account 530, and the first predetermined criterion is the sandbox validation criterion. Other two accounts examples of pipeline 500 are also possible.

In certain embodiments, pipeline 500 comprises three accounts; a first account, a second account and a third account. The first account and second account are as described above. Further, the third account is configured with a third predetermined user access level to the protected data and the computer executable code, the third predetermined user access level having reduced access to the computer executable code and/or increased access to the protected data compared to the second predetermined user access level.

In one example of pipeline 500 having three accounts, the first account is on-boarding account 510, the second account is preparation account 520 and the third account is run account 530. Moreover, the first predetermined criterion is the on-boarding validation criterion, and the second predetermined criterion is the preparation validation criterion. Other three account examples of pipeline 500 are also possible.

In certain embodiments, pipeline 500 comprises four accounts; a first account, a second account, a third account and a fourth account. The first account, second account and third account are as described above. Further, the fourth account is configured with a fourth predetermined user access level to the protected data and the computer executable code, the fourth predetermined user access level having reduced access to the computer executable code and/or increased access to the protected data compared to the third predetermined user access level.

In one example of pipeline 500 having four accounts, the first account is sandbox account 505, the second account is on-boarding account 510, the third account is preparation account 520, and the fourth account is run account 530. Other four account examples of pipeline 500 are also possible.

TABLE 1

|  | Sandbox account | On-boarding account | Preparation account | Run account |
| --- | --- | --- | --- | --- |
| Security assessment | Not complete | Assets assessed | Assets assessed | Complete, runtime assessed |
| Data type | Dummy data | Dummy data or pseudonymised data Log access | Dummy data | Protected data |
| User log access | None | Limited execution logs | None | None |
| Secure provider log access | Data traffic logs | Execution and data traffic logs Key controls | Execution and data traffic logs | Execution and data traffic logs |
| Internet access | None | None | Stubbed | Managed |

Process for Generating a Secure Validation Pipeline

The invention involves a process for generating pipeline 500 for securely validating computer executable code in cloud environment 100. By way of an overview, the process comprises the steps of receiving a request to validate computer executable code, and a generating the plurality of accounts in response to the request. The process is performed by pipeline generator 410.

Before the process commences, the computer executable code is input into cloud environment 100, in particular to experimental build account 450, by user 140. The computer executable code is transferred via an encrypted link in communication network 110. For example, the computer executable code may be transferred using SFTP (SSH File Transfer Protocol), and the link secured through the use of SSH (Secure Shell) host keys to authenticate the transfer. Once in cloud environment 100, the computer executable code is virus scanned to ensure that the computer executable code does not bring viruses into secure portion 400.

Before the process commences, the protected data may already also be input into the experimental build account 450 by secure provider 130. However, it is preferred that the protected data is not input into experimental build account 450, or anywhere within secure portion 400, until a data request for protected data, for example via a request to access an API, is approved.

The step of receiving a request to validate computer executable code comprises receiving, from user 140 or from secure data provider 130 into cloud environment 100, a request to validate computer executable code which has been input into cloud environment 100 by user 140, where the computer executable code is configured to process protected data input into cloud environment 100 from secure data provider 140. This request is routed to experimental build account 450 of secure portion 400 by router 236.

Once the request to validate computer executable code is received at experimental build account 450, the computer executable code is sent to pipeline generator 410. Pipeline generator 410 is responsible for generating the plurality of accounts in response to the request.

If pipeline 500 does not contain sandbox account 505, once the request to validate computer executable code is received at experimental build account 450, the computer executable code is also sent to service provisioner 420 to determine whether the computer executable code contains any data requests, and provision these services to the computer executable code. Data requests for protected data from secure provider are not provisioned at this stage. If pipeline 500 does contain sandbox account 505, then the computer executable code is not sent to service provisioner 420 until after the computer executable code has passed the sandbox validation criterion.

In some embodiments, before the computer executable code is sent to service provisioner 420 or pipeline generator 410, there is a manual validation step. In the manual validation step, secure provider 130 performs additional checks to ensure that user 140 and the computer executable code pass initial security checks, such as a virus scanner. Alternatively, this manual validation may be performed as part of sandbox account 505.

With reference to the exemplary pipeline 500 of FIG. 5, pipeline generator 410 generates within cloud environment 100, in particular within secure portion 400, sandbox account 505 for user 140, on-boarding account 510 for user 140, preparation account 520 for user 140 and run account 530 for user 140. However, it should be appreciated that pipeline generator 410 may generate any two or more of the accounts referred to above, depending on the nature of the computer executable code to be validated. Once pipeline generator 401 has generated the plurality of accounts, then the process for generating pipeline 500 is complete.

Notably, pipeline 500 is user-specific and experiment-specific, meaning that a new pipeline 500 is generated for each user 140 and each request for validation of computer executable code.

Method of Secure Validation

Figure 6:
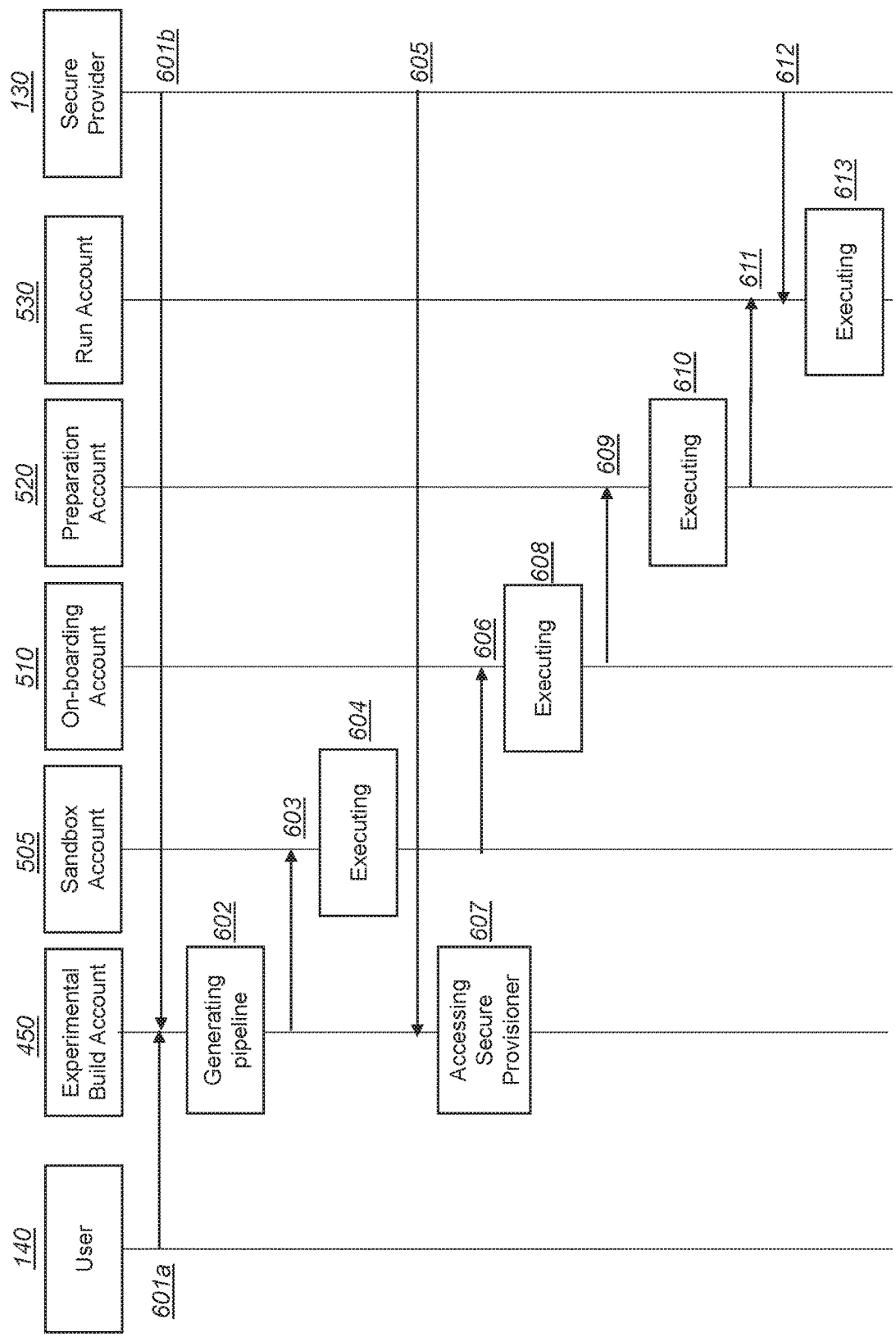
FIG. 6 is a sequence diagram of a first method of securely validating computer executable code in a third-party cloud environment according to the invention.

As mentioned, pipeline 500 is used for securely validating computer executable code in cloud environment 100. FIG. 6 shows an exemplary method of securely validating computer executable code in cloud environment 100 using pipeline 500 of FIG. 5. In particular, FIG. 6 shows a method for pipeline 500 with four accounts (sandbox account 505, on-boarding account 510, preparation account 520, and run account 530) However, it should be appreciated that if one or more of these accounts are omitted from pipeline 500, then the corresponding method steps are not performed.

Prior to the first step 601 shown in FIG. 6, the computer executable code is input into cloud environment 100, in particular to experimental build account 450, by user 140. The computer executable code is transferred via an encrypted link in communication network 110. For example, the computer executable code may be transferred using SFTP (SSH File Transfer Protocol), and the link secured through the use of SSH (Secure Shell) host keys to authenticate the transfer. Once in cloud environment 100, the computer executable code is virus scanned to ensure that the computer executable code does not bring viruses into secure portion 400, and may be stored in secure portion 400. The computer executable code may be accessible to user 140 via first virtual desktop 440 of experimental build account 450.

Then, referring to FIG. 6, the first step 601 of the method for pipeline 500 is to receive from user 140 (step 601a) or from a secure provider 130 (step 601b) to secure portion 400, in particular to experimental build account 450, a request to validate computer executable code. This is the same first step as in the process for generating pipeline 500 discussed above. The request is received by experimental build account 450 from user 140 via first virtual desktop 440 or from secure provider 130 via second virtual desktop 430.

The next step 602 is to generate pipeline 500. In this exemplary method, pipeline 500 has four accounts; sandbox account 505, on-boarding account 510, preparation account 520 and run account 530. This is performed in the same way as in the process for generating pipeline 500 discussed above.

Once pipeline 500 has been generated, the next step 603 is to receive the computer executable code at the first account of pipeline 500. In particular, the computer executable code is received from experimental build account 450 to sandbox account 505 of pipeline 500. Optionally, user 140 may modify the computer executable code in sandbox account 505.

In order to execute the computer executable code in sandbox account 510 without using protected data from secure provider 130 and without service provisioner 420, dummy data may be provided by user 140 to sandbox account 505. In particular, the dummy data is stored in experimental build account 450, and then sent to sandbox account 505, since no service requests for data can be made.

In step 604, once sandbox account 505 receives the computer executable code and the dummy data, and user 140 is finished modifying the computer executable code, sandbox account 505 executes, in sandbox account 505, the computer executable code with the dummy data.

When executing the computer executable code with the dummy data, sandbox account 550 is configured to analyse the computer executable code against the one or more security checks described. Secure provider 130 uses the results of these one or more security checks to manually validate the computer executable code. In step 605, manual validation is input to experimental build account 450 by secure provider 130 via second virtual desktop 430. From this, in step 606, sandbox account 505 determines that the computer executable code meets the sandbox validation criterion, and transmits the computer executable code from sandbox account 505 to on-boarding account 510. Upon meeting the sandbox validation criterion, access to secure provisioner 420 is provisioned in step 607. This is performed by experimental build account 450.

Once in on-boarding account 510, user 140 may modify the computer executable code. Access to the computer executable code is provided to user 140 via the first virtual desktop 440 in experimental build account 450.

In order to execute the computer executable code in on-boarding account 510 without using protected data from secure provider 130, secure provider 130 may provide dummy data or pseudoynmised data to on-boarding account 510, since user 140 has access to service provider 420. Provision for this dummy data or pseudonymised data from secure provider 130 is provided via service provisioner 420. In an alternative embodiment, dummy data may be provided by user 140 from outside secure portion 400 via service provisioner 420. In yet a further alternative embodiment dummy data may be provided in the same manner as for sandbox account 505.

In step 608, once on-boarding account 510 receives the computer executable code and the dummy data, and user 140 is finished modifying the computer executable code, on-boarding account 510 executes, in on-boarding account 510, the computer executable code with dummy data.

When executing the computer executable code with the dummy data, on-boarding account 510 is configured to analyse the computer executable code against the first predetermined criterion in the way described above. From this, in step 609, on-boarding account determines if the computer executable code meets the on-boarding validation criterion, and transmits the computer executable code from on-boarding account 510 to preparation account 520 if the on-boarding validation criterion is met.

In order to execute the computer executable code in preparation account 520 without using protected data from secure provider 130, secure provider 130 may provide dummy data to preparation account 520. The dummy data may be the same data as the dummy data provided to on-boarding account 510, or may be different data to the dummy data provided to on-boarding account 510. Provision for this dummy data from secure provider 130 may be provided via service provisioner 420. In an alternative embodiment, dummy data may be provided by user 140 from outside secure portion 400 via service provisioner 420. In yet a further alternative embodiment dummy data may be provided in the same manner as for sandbox account 505.

In step 610, once preparation account 520 receives the computer executable code and the dummy data, preparation account 520 executes, in preparation account 520, the computer executable code with the dummy data. This step is fully automated since user 140 has no access to preparation account 520.

When executing the computer executable code with the dummy data, preparation account 510 is configured to analyse the computer executable code against the preparation validation criterion in the way described above. From this, in step 611, preparation account 520 determines if the computer executable code meets the preparation validation criterion, and transmits the computer executable code from preparation account 520 to run account 520 if the preparation validation criterion is met.

In order to execute the computer executable code in run account 530 with protected data, secure provider 130 may provide the protected data to run account 530 in step 612. Provision for this protected data from secure provider 130 is provided via service provisioner 420. The protected data is encrypted before being provided to run account 530. Additionally or alternatively, the protected data is transferred via an encrypted link in communication network 110. For example, the protected data may be transferred using SFTP (SSH File Transfer Protocol), and the link secured through the use of SSH (Secure Shell) host keys to authenticate the transfer.

Once run account 530 receives the computer executable code and the protected data, run account 530 in step 613 executes, in run account 530, the computer executable code with protected data. This step is fully automated since user 140 has no access to run account 530.

When executing the computer executable code with the protected data, run account 530 is configured to analyse the execution of the computer executable code and produce results of the validation for secure provider 130 to review, and optionally for user 140. This is performed using the aforementioned logs, including the execution logs, the data traffic logs, and the runtime logs.

It will be appreciate that not all of the above steps are necessary for a method of secure validation according to the invention. The steps required depend on the accounts that are implemented in pipeline 500, as described above.

General

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention can take the form of an entirely hardware embodiment, an entirely software embodiment or an embodiment containing both hardware and software elements. Hardware elements may be physical hardware elements or virtual hardware elements. In a preferred embodiment, the invention is implemented in software.

Furthermore, the invention can take the form of a computer program embodied as a computer-readable medium having computer executable code for use by or in connection with a computer. For the purposes of this description, a computer readable medium can be any tangible apparatus that can contain, store, communicate, propagate, or transport the program for use by or in connection with the computer. Moreover, a computer-readable medium can be an electronic, magnetic, optical, electromagnetic, infrared, or semi-conductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The flow diagrams in the drawings illustrate the architecture, functionality, and operation of possible implementations of methods according to various embodiments of the present invention. In this regard, each block in the flow diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the flow diagrams, and combinations of blocks in the flow diagrams, can be implemented by special purpose hardware-based systems that perform the specified functions or acts, or combinations of special purpose hardware and computer instructions.

It will be understood that the above description of is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

Embodiments

The following list provides embodiments of the invention and forms part of the description. These embodiments can be combined in any compatible combination beyond those expressly stated. The embodiments can also be combined with any compatible features described herein:

1. A process for generating a pipeline for securely validating computer executable code in a third-party cloud environment, the process comprising:

receiving, from a user or from a secure provider into the third-party cloud environment, a request to validate computer executable code which has been input into the third-party cloud environment from the user, the computer executable code being configured to process protected data input into the third-party cloud environment from the secure provider;

generating within the third-party cloud environment, a first account for the user, wherein the first account is configured with a first predetermined user access level to the protected data and the computer executable code; and generating within the third-party cloud environment, a second account for the user, wherein the second account is configured with a second predetermined user access level to the protected data and the computer executable code, the second predetermined user access level having reduced access to the computer executable code and/or increased access to the protected data compared to the first predetermined user access level, wherein the first account is configured to transmit the computer executable code from the first account to the second account if a first predetermined criterion is met.

2. The process of embodiment 1, wherein the first account is a sandbox account and the second account is an on-boarding account, and wherein the first predetermined criterion is a sandbox validation criterion.

3. The process of embodiment 1, wherein the first account is a preparation account and the second account is a run account, and wherein the first predetermined criterion is a preparation validation criterion.

4. The process of embodiment 1, further comprising:

generating within the third-party cloud environment, a third account for the user, wherein the third account is configured with a third predetermined user access level to the protected data and the computer executable code, the third predetermined user access level having reduced access to the computer executable code and/or increased access to the protected data compared to the second predetermined user access level, wherein the second account is configured to transmit the computer executable code from the second account to the third account if a second predetermined criterion is met.

5. The process of embodiment 4, wherein the first account is an on-boarding account, the second account is a preparation account and the third account is a run account, and wherein the first predetermined criterion is an on-boarding validation criterion and the second predetermined criterion is a preparation validation criterion.

6. The process of embodiment 4, further comprising:

generating within the third-party cloud environment, a fourth account for the user, wherein the fourth account is configured with a fourth predetermined user access level to the protected data and the computer executable code, the fourth predetermined user access level having reduced access to the computer executable code and/or increased access to the protected data compared to the third predetermined user access level, wherein the third account is configured to transmit the computer executable code from the third account to the fourth account if a third predetermined criterion is met.

7. The process of embodiment 6, wherein the first account is a sandbox account, the second account is an on-boarding account, the third account is a preparation account, and the fourth account is a run account, wherein the first predetermined criterion is a sandbox validation criterion, the second predetermined criterion is an on-boarding validation criterion, and the third predetermined criterion is a preparation validation criterion.

8. The process of any of embodiments 3, 5 or 7, wherein the preparation account is configured to prevent user access to the protected data and prevent user access to the computer executable code 9. The process of embodiment 8, wherein the preparation account is configured to log data traffic within the preparation account when executing the computer executable code.

10. The process of embodiment 9, wherein the preparation account is configured to analyse the data traffic to identify one or more data requests.

11. The process of embodiment 10, wherein one of the one or more data requests is a request to an external provider.

12. The process of embodiment 10, wherein one of the one or more data requests is a request to the secure provider.

13. The process of any of embodiment 8 to 12, wherein the preparation account is configured to simulate one or more APIs.

14. The process of any of embodiments 8 to 13, wherein the preparation validation criterion comprises that the computer executable code satisfies static code requirements, that only expected computer resources are used when executing the computer executable code, and/or that no malware is detected in the computer executable code 15. The process of any of embodiments 3, 5 or 7, wherein the run account is configured to allow the user to execute the computer executable code with the protected data and prevent the user from accessing the computer executable code.

16. The process of embodiment 15, wherein the run account is configured to log data traffic within the run account when executing the computer executable code.

17. The process of embodiment 16, wherein the run account is configured to analyse the data traffic to identify one or more data requests.

18. The process of embodiment 17, wherein one of the one or more data requests is a request to an external provider.

19. The process of embodiment 17, wherein one of the one or more data requests is a request to the secure provider.

20. The process of any of embodiments 16 to 19, wherein the run account is configured to provide visualisation of the data traffic between the run account and the user, the secure provider, and/or the external provider.

21. The process of embodiment 20, wherein the visualisation depicts the one or more data requests.

22. The process of any of embodiments 17 to 21, wherein the run account is configured to identify whether any of the one or more data requests are invalid.

23. The process of embodiment 22, wherein the run account is configured to intercept the invalid data request.

24. The process of any of embodiments 15 to 23, wherein the run account is configured to restrict the user from retrieving output data, the output data resulting from executing the computer executable code with the protected data.

25. The process of embodiment 24, wherein the run account is configured to prevent the user from obtaining a protected subset of the output data from the run account, but enabling the user to retrieve an unprotected subset of the output data.

26. The process of embodiment 25, wherein the unprotected subset of the output data comprises only a summary of the output data.

27. The process of embodiment 25, wherein the unprotected subset of the output data comprises a visual report provided to the user via the third-party cloud environment.

28. The process of any of embodiments 2, 5 or 7, wherein the on-boarding account is configured to allow the user to access the computer executable code and prevent the user from accessing the protected data.

29. The process of embodiment 28, wherein the on-boarding account is configured to allow the user to modify the computer executable code.

30. The process of any of embodiments 2, 5 or 7, wherein the on-boarding validation criterion comprises that the computer executable code satisfies static code requirements, that only expected computer resources are used when executing the computer executable code, and/or that no malware is detected in the computer executable code.

31. The process of embodiment 2 or 7, wherein the sandbox account is configured to allow the user to access the computer executable code, and prevent the user from accessing the protected data and a service provisioner.

32. The process of embodiment 2 or 7 wherein the sandbox validation criterion comprises an authorisation from the secure provider.

33. The process of any of embodiments 2, 3, 5 or 7, wherein one or more of the sandbox account, on-boarding account, preparation account and run account is configured with multi-factor authentication to ensure that the user is authentic.

34. The process of any of embodiments 2, 3, 5, or 7, wherein one or more of the sandbox account, on-boarding account, preparation account and run account is configured to log execution information.

35. A pipeline for securely testing computer executable code in a third-party cloud environment, the pipeline generated by the process of any preceding embodiment.

36. A cloud environment comprising a secure portion, the secure portion configured to perform the process of any of embodiments 1 to 34, or comprising the pipeline of embodiment 35.

37. The cloud environment of embodiment 36, wherein the secure portion further comprises an experimental build account, the experimental build account configured to receive, from the user or from the secure provider, the request to test computer executable code.

38. The cloud environment of embodiment 37, wherein the experimental build account comprises a virtual private cloud.

39. The cloud environment of embodiment 38, wherein the virtual private cloud is private such that the experimental build account has no access to a communication network.

40. The cloud environment of embodiment 38, wherein the virtual private cloud is public, the experimental build account further comprising a security gateway such that the experimental build account has limited access to a communication network.

41. The cloud environment of any of embodiments 37 to 40, wherein the experimental build account further comprises a service provisioner configured to determine whether the computer executable code contains any data requests and assist with providing services to the computer executable code.

42. The cloud environment of any of embodiments 37 to 41, wherein the experimental build account further comprises a pipeline generator configured to generate the pipeline.

43. Computer hardware configured to generate the pipeline of any of embodiments 1 to 34, to host the pipeline of embodiment 35 or to host the cloud environment of any of embodiments 36 to 42.

44. A method of securely validating computer executable code in a third-party cloud environment, the method using the process of any of embodiments 1 to 34, the pipeline of embodiment 35, the cloud environment of any of embodiments 36 to 42, or the computer hardware of embodiment 43.

The invention claimed is:

1. A process for generating a pipeline for securely validating computer executable code in a third-party cloud environment, the process comprising:
receiving, from a user or from a secure provider into the third-party cloud environment, a request to validate computer executable code which has been input into the third-party cloud environment from the user, the computer executable code being configured to process protected data input into the third-party cloud environment from the secure provider;
generating, within the third-party cloud environment, a first account for the user, wherein the first account is configured with a first predetermined user access level to the protected data and the computer executable code; and
generating, within the third-party cloud environment, a second account for the user, wherein the second account is configured with a second predetermined user access level to the protected data and the computer executable code, the second predetermined user access level having reduced access to the computer executable code and/or increased access to the protected data compared to the first predetermined user access level,
wherein the first account is configured to transmit the computer executable code from the first account to the second account when a first predetermined criterion is met.

2. The process of claim 1, further comprising:
generating within the third-party cloud environment, a third account for the user, wherein the third account is configured with a third predetermined user access level to the protected data and the computer executable code, the third predetermined user access level having reduced access to the computer executable code and/or increased access to the protected data compared to the second predetermined user access level,
wherein the second account is configured to transmit the computer executable code from the second account to the third account when a second predetermined criterion is met.

3. The process of claim 2, further comprising:
generating within the third-party cloud environment, a fourth account for the user, wherein the fourth account is configured with a fourth predetermined user access level to the protected data and the computer executable code, the fourth predetermined user access level having reduced access to the computer executable code and/or increased access to the protected data compared to the third predetermined user access level,
wherein the third account is configured to transmit the computer executable code from the third account to the fourth account when a third predetermined criterion is met.

4. The process of claim 3, wherein the first account is a sandbox account, the second account is an on-boarding account, the third account is a preparation account, and the fourth account is a run account, wherein the first predetermined criterion is a sandbox validation criterion, the second predetermined criterion is an on-boarding validation criterion, and the third predetermined criterion is a preparation validation criterion.

5. The process of claim 4, wherein the preparation account is configured to prevent user access to the protected data and prevent user access to the computer executable code, and
wherein the preparation validation criterion comprises that the computer executable code satisfies static code requirements, that only expected computer resources are used when executing the computer executable code, and/or that no malware is detected in the computer executable code.

6. The process of claim 5, wherein the preparation account is configured to log data traffic within the preparation account when executing the computer executable code, analyse the data traffic to identify one or more data requests, and to simulate one or more APIs.

7. The process of claim 4, wherein the run account is configured to allow the user to execute the computer executable code with the protected data and prevent the user from accessing the computer executable code.

8. The process of claim 7, wherein the run account is configured to log data traffic within the run account when executing the computer executable code, analyse the data traffic to identify one or more data requests, identify whether any of the one or more data requests are invalid, and to intercept the invalid data request.

9. The process of claim 4, wherein the on-boarding account is configured to allow the user to access the computer executable code and prevent the user from accessing the protected data, and
wherein the on-boarding validation criterion comprises that the computer executable code satisfies static code requirements, that only expected computer resources are used when executing the computer executable code, and/or that no malware is detected in the computer executable code.

10. The process of claim 9, wherein the on-boarding account is configured to allow the user to modify the computer executable code.

11. The process of claim 4, wherein the sandbox account is configured to allow the user to access the computer executable code and prevent the user from accessing the protected data and a service provisioner, and
wherein the sandbox validation criterion comprises an authorisation from the secure provider.

12. A non-transitory computer readable medium storing instructions that, when executed by one or more computer processors, cause the one or more computer processors to:
receive, from a user or from a secure provider into the third-party cloud environment, a request to validate computer executable code which has been input into the third-party cloud environment from the user, the computer executable code being configured to process protected data input into the third-party cloud environment from the secure provider;
generate, within the third-party cloud environment, a first account for the user, wherein the first account is configured with a first predetermined user access level to the protected data and the computer executable code; and
generate, within the third-party cloud environment, a second account for the user, wherein the second account is configured with a second predetermined user access level to the protected data and the computer executable code, the second predetermined user access level having reduced access to the computer executable code and/or increased access to the protected data compared to the first predetermined user access level,
wherein the first account is configured to transmit the computer executable code from the first account to the second account when a first predetermined criterion is met.

13. The non-transitory computer readable medium of claim 12, wherein the instructions further cause the one or more computer processors to operate so as to:
generate within the third-party cloud environment, a third account for the user, wherein the third account is configured with a third predetermined user access level to the protected data and the computer executable code, the third predetermined user access level having reduced access to the computer executable code and/or increased access to the protected data compared to the second predetermined user access level,
wherein the second account is configured to transmit the computer executable code from the second account to the third account when a second predetermined criterion is met.

14. The non-transitory computer readable medium of claim 13, wherein the instructions further cause the one or more computer processors to operate so as to:
generate within the third-party cloud environment, a fourth account for the user, wherein the fourth account is configured with a fourth predetermined user access level to the protected data and the computer executable code, the fourth predetermined user access level having reduced access to the computer executable code and/or increased access to the protected data compared to the third predetermined user access level,
wherein the third account is configured to transmit the computer executable code from the third account to the fourth account when a third predetermined criterion is met.

15. The non-transitory computer readable medium of claim 14, wherein the first account is a sandbox account, the second account is an on-boarding account, the third account is a preparation account, and the fourth account is a run account, wherein the first predetermined criterion is a sandbox validation criterion, the second predetermined criterion is an on-boarding validation criterion, and the third predetermined criterion is a preparation validation criterion.

16. The non-transitory computer readable medium of claim 15, wherein the preparation account is configured to prevent user access to the protected data and prevent user access to the computer executable code, and
wherein the preparation validation criterion comprises that the computer executable code satisfies static code requirements, that only expected computer resources are used when executing the computer executable code, and/or that no malware is detected in the computer executable code.

17. The non-transitory computer readable medium of claim 16, wherein the preparation account is configured to log data traffic within the preparation account when executing the computer executable code, analyse the data traffic to identify one or more data requests, and to simulate one or more APIs.

18. The non-transitory computer readable medium of claim 15, wherein the run account is configured to allow the user to execute the computer executable code with the protected data and prevent the user from accessing the computer executable code.

19. The non-transitory computer readable medium of claim 18, wherein the run account is configured to log data traffic within the run account when executing the computer executable code, analyse the data traffic to identify one or more data requests, identify whether any of the one or more data requests are invalid, and to intercept the invalid data request.

20. A system for generating a pipeline for securely validating computer executable code in a third-party cloud environment, the system comprising:

at least one computer processor configured to:

receive, from a user or from a secure provider into the third-party cloud environment, a request to validate computer executable code which has been input into the third-party cloud environment from the user, the computer executable code being configured to process protected data input into the third-party cloud environment from the secure provider;

generate, within the third-party cloud environment, a first account for the user, wherein the first account is configured with a first predetermined user access level to the protected data and the computer executable code; and generate, within the third-party cloud environment, a second account for the user, wherein the second account is configured with a second predetermined user access level to the protected data and the computer executable code, the second predetermined user access level having reduced access to the computer executable code and/or increased access to the protected data compared to the first predetermined user access level, wherein the first account is configured to transmit the computer executable code from the first account to the second account when a first predetermined criterion is met; and at least one memory, coupled to the at least one processor, configured to provide the at least one processor with instruction.

21. The system of claim 20, wherein the at least one computer processer is further configured to:

generate within the third-party cloud environment, a third account for the user, wherein the third account is configured with a third predetermined user access level to the protected data and the computer executable code, the third predetermined user access level having reduced access to the computer executable code and/or increased access to the protected data compared to the second predetermined user access level, wherein the second account is configured to transmit the computer executable code from the second account to the third account when a second predetermined criterion is met.

* * * * *